United States Patent
Lee et al.

(10) Patent No.: US 8,194,389 B2
(45) Date of Patent: Jun. 5, 2012

(54) MULTILAYER CHIP CAPACITOR INCLUDING TWO TERMINALS

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 482 days.

(21) Appl. No.: 12/245,865

(22) Filed: Oct. 6, 2008

(65) Prior Publication Data

US 2009/0213525 A1    Aug. 27, 2009

(30) Foreign Application Priority Data

Feb. 21, 2008    (KR) .................. 10-2008-0015732

(51) Int. Cl.
*H01G 4/005* (2006.01)
*H01G 4/06* (2006.01)
*H01G 4/228* (2006.01)

(52) U.S. Cl. .............. 361/303; 361/321.2; 361/306.3

(58) Field of Classification Search .......... 361/303, 361/321.2, 306.3, 310, 308.1, 306.1, 306.2, 361/321.1, 328, 329, 330
See application file for complete search history.

(56) References Cited

U.S. PATENT DOCUMENTS

| | | | | |
|---|---|---|---|---|
| 4,814,940 A * | 3/1989 | Horstmann et al. | .......... | 361/309 |
| 7,457,099 B2 * | 11/2008 | Togashi et al. | ............. | 361/306.3 |
| 7,495,885 B2 * | 2/2009 | Togashi et al. | ............. | 361/306.3 |
| 7,551,422 B2 * | 6/2009 | Togashi | ........................ | 361/309 |
| 7,663,862 B2 * | 2/2010 | Togashi | ..................... | 361/306.3 |
| 2007/0274022 A1 | 11/2007 | Togashi | | |
| 2008/0310077 A1 * | 12/2008 | Itamura et al. | ............. | 361/306.3 |
| 2009/0154055 A1 * | 6/2009 | Takashima et al. | ........ | 361/301.4 |

FOREIGN PATENT DOCUMENTS

| JP | 2000-208361 | 7/2000 |
|---|---|---|
| JP | 2002-151349 | 5/2002 |

OTHER PUBLICATIONS

Korean Office Action issued in Korean Patent Application No. KR 10-2008-0015732 dated May 19, 2009 with English Translation.

\* cited by examiner

*Primary Examiner* — Eric Thomas
*Assistant Examiner* — David M Sinclair
(74) *Attorney, Agent, or Firm* — McDermott Will & Emery LLP

(57) ABSTRACT

A multilayer chip capacitor includes a capacitor body including first and second longer side surfaces facing each other and first and second shorter side surfaces facing each other, first and second external electrodes respectively disposed at the first and second longer side surfaces, one or more first internal electrode pairs each including first and second internal electrodes, and one or more second internal electrode pairs each including third and fourth internal electrodes. The first to fourth internal electrodes each have one lead and are sequentially disposed in a stacked direction. The first to fourth internal electrodes have first to fourth leads respectively extending to first to fourth corners or portions adjacent thereto, and alternately connected with the first and second external electrodes. The first internal electrode pair and the second internal electrode pair cause a current to diagonally flow in opposite directions with respect to a long side direction.

13 Claims, 14 Drawing Sheets

MULTILAYER CHIP CAPACITOR INCLUDING TWO TERMINALS

CROSS-REFERENCE TO RELATED APPLICATIONS

This application claims the priority of Korean Patent Application No. 2008-15732 filed on Feb. 21, 2008, in the Korean Intellectual Property Office, the disclosure of which is incorporated herein by reference.

BACKGROUND OF THE INVENTION

1. Field of the Invention

The present invention relates to a multilayer chip capacitor that is suitable to be used as a decoupling capacitor in a power distribution network of a micro process unit (MPU), and more particularly, to a 2-terminal low-inductance chip capacitor that can achieve high equivalent series resistance (ESR) while minimizing an increase in equivalent series inductance (ESL).

2. Description of the Related Art

An operating frequency for a high-speed micro processor unit (MPU) is continuously increasing, leading to an increase in current consumption, and an operating voltage for an MPU chip is being lowered. Thus, it becomes more difficult to suppress noise of a DC supply voltage, which occurs due to sudden fluctuation of a load current of the MPU, below a certain level (generally, 5~10%). To remove the voltage noise, a multilayer chip capacitor is being widely used in a power distribution network. The multilayer chip capacitor for decoupling removes the voltage noise by supplying a current to a central processing unit (CPU) at the time of sudden fluctuation of the load current.

Recently, the load current fluctuates even more rapidly with the further increase in operating frequency of the MPU. Therefore, a decoupling capacitor is required to have higher capacitance, higher equivalent series resistance (ESR) and lower equivalent series inductance (ESL), so that magnitude of an impedance of a power distribution network can be maintained at a low and constant level within a broad frequency band. This can ultimately contribute to suppressing the voltage noise caused by the sudden fluctuation of the load current.

A typical 2-terminal low inductance chip capacitor (LICC) being widely used these days is also called a reverse geometry capacitor (RGC). The LICC has an exterior and an internal electrode structure as illustrated in FIGS. 1A and 1B. Referring to FIGS. 1A and 1B, rectangular internal electrodes 1 and 2 having opposite polarities are alternately disposed in a capacitor body 21 of a related art LICC 20, with a dielectric layer 21a interposed therebetween. Because external electrodes 11 and 22 of the related art LICC 20 cover wide areas of longer side surfaces of the capacitor body 21, respectively, short current paths (as indicated by arrows in FIG. 1B) and large contact areas between the external electrodes 11 and 12 and the internal electrodes 1 and 2 can be achieved, thereby lowering the ESL. However, in this case, the ESR is also lowered as well as the ESL, because of the short current paths within the internal electrodes 1 and 2 and the large contact areas between the internal electrodes 1 and 2 and the external electrodes 11 and 12. The low ESR causes the power distribution network of the high-speed MPU to be unstable.

SUMMARY OF THE INVENTION

An aspect of the present invention provides a 2-terminal multilayer chip capacitor that achieves high equivalent series resistance (ESR) while minimizing an increase in equivalent series inductance (ESL).

According to an aspect of the present invention, there is provided a multilayer chip capacitor including: a capacitor body having a stacked structure of a plurality of dielectric layers and including first and second longer side surfaces facing each other and first and second shorter side surfaces facing each other; a first external electrode and a second external electrode having different polarities and disposed at the first longer side surface and the second longer side surface, respectively; one or more first internal electrode pairs each including a first internal electrode and a second internal electrode facing each other in the capacitor body with a dielectric layer therebetween; and one or more second internal electrode pairs each including a third internal electrode and a fourth internal electrode facing each other in the capacitor body with a dielectric layer therebetween. The first to fourth internal electrodes each have one lead and are sequentially disposed in a stacked direction. The first internal electrode has a first lead extending to a first corner at which the first longer side surface meets the first shorter side surface or to a portion adjacent to the first corner, the first lead being connected to the first external electrode. The second internal electrode has a second lead extending to a second corner diagonally facing the first corner or a portion adjacent to the second corner, the second lead being connected to the second external electrode. The third internal electrode has a third lead extending to a third corner at which the first longer side surface meets the second shorter side surface or a portion adjacent to the third corner, the third lead being connected to the first external electrode. The fourth internal electrode has a fourth lead extending to a fourth corner diagonally facing the third corner or a portion adjacent to the fourth corner, the fourth lead being connected to the second external electrode.

The first internal electrode pair may cause a current to flow from the first corner toward the second corner, and the second internal electrode pair may cause a current to flow from the third corner toward the fourth corner.

The first to fourth leads may extend to the first to fourth corners, respectively. At least one of the first to fourth leads may be gradually tapered from a connection portion connected with a corresponding one of the first and second external electrodes toward a connection portion connected with a main part of a corresponding one of the first to fourth internal electrodes.

The first lead and the second lead may extend to portions of the first shorter side surface and the second shorter side surface, which are adjacent to the first corner and the second corner, respectively, and the third lead and the fourth lead may extend to portions of the second shorter side surface and the first shorter side surface, which are adjacent to the third corner and the fourth corner, respectively. The first to fourth leads may extend toward the first to fourth corners, inclined at predetermined angles to main parts of the first to fourth internal electrodes, respectively.

The multilayer chip capacitor may further include: a third internal electrode pair including a fifth internal electrode and a sixth internal electrode facing each other in the capacitor body with a dielectric layer therebetween; and a fourth internal electrode pair including a seventh internal electrode and an eighth internal electrode facing each other in the capacitor body with a dielectric layer therebetween. The fifth to eighth internal electrodes each have one lead, and the first to eighth internal electrodes are sequentially disposed in a stacked direction. The fifth internal electrode has a fifth lead extending to the first corner or a portion adjacent to the first corner, and connected to the first external electrode. The sixth internal electrode has a sixth lead extending to the second corner or a portion adjacent to the second corner, and connected to the second external electrode. The seventh internal electrode has a seventh lead extending to the third corner or a portion adjacent to the third corner, and connected to the first external electrode. The eighth internal electrode has an eighth lead extending to the fourth corner or a portion adjacent to the fourth corner, and connected to the second external electrode.

The leads that are vertically adjacent to each other and have the same polarity may extend in different directions forming a predetermined angle therebetween. The first lead may extend to a portion of the first longer side surface adjacent to the first corner, the second lead may extend to a portion of the second longer side surface adjacent to the second corner, the third lead may extend to a portion of the first longer side surface adjacent to the third corner, the fourth lead may extend to a portion of the second longer side surface adjacent to the fourth corner, the fifth lead may extend to a portion of the first shorter side surface adjacent to the first corner, the sixth lead may extend to a portion of the second shorter side surface adjacent to the second corner, the seventh lead may extend to a portion of the second shorter side surface adjacent to the third corner, and the eighth lead may extend to a portion of the first shorter side surface adjacent to the fourth corner.

The multilayer chip capacitor may further include one or more rectangular internal electrode pairs, each including a first rectangular internal electrode and a second rectangular internal electrode facing each other in the capacitor body with a dielectric layer therebetween and respectively connected to the first external electrode and the second external electrode over entire lengths in a long side direction. The one or more rectangular internal electrode pairs may be stacked in the capacitor body to form a first capacitor part, and the one or more first internal electrode pairs and the one or more second internal electrode pairs may be alternately stacked in the capacitor body to form a second capacitor body. The first capacitor part and the second capacitor part may be arranged in a stacked direction.

The first capacitor part may be disposed at a lower end in the capacitor body, and the second capacitor part may be disposed on the first capacitor part.

The first capacitor part may be disposed at each of upper and lower ends in the capacitor body, and the second capacitor part may be disposed between the first capacitor part disposed at the upper end and the first capacitor part disposed at the lower end. The first capacitor part at the upper end may be symmetrical with respect to the first capacitor part at the lower end, and upper and lower portions of the multilayer chip capacitor may be symmetrical to each other.

Equivalent series resistance (ESR) per layer provided by the first internal electrode pair or the second internal electrode pair of the second capacitor part may be higher than ESR per layer provided by the rectangular internal electrode pair including the first rectangular internal electrode and the second rectangular internal electrode facing each other within the first capacitor part. Equivalent series inductance (ESL) per layer provided by the rectangular internal electrode pair including the first rectangular internal electrode and the second rectangular internal electrode facing each other within the first capacitor part may be lower than ESL per layer provided by the first internal electrode pair or the second internal electrode pair of the second capacitor part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
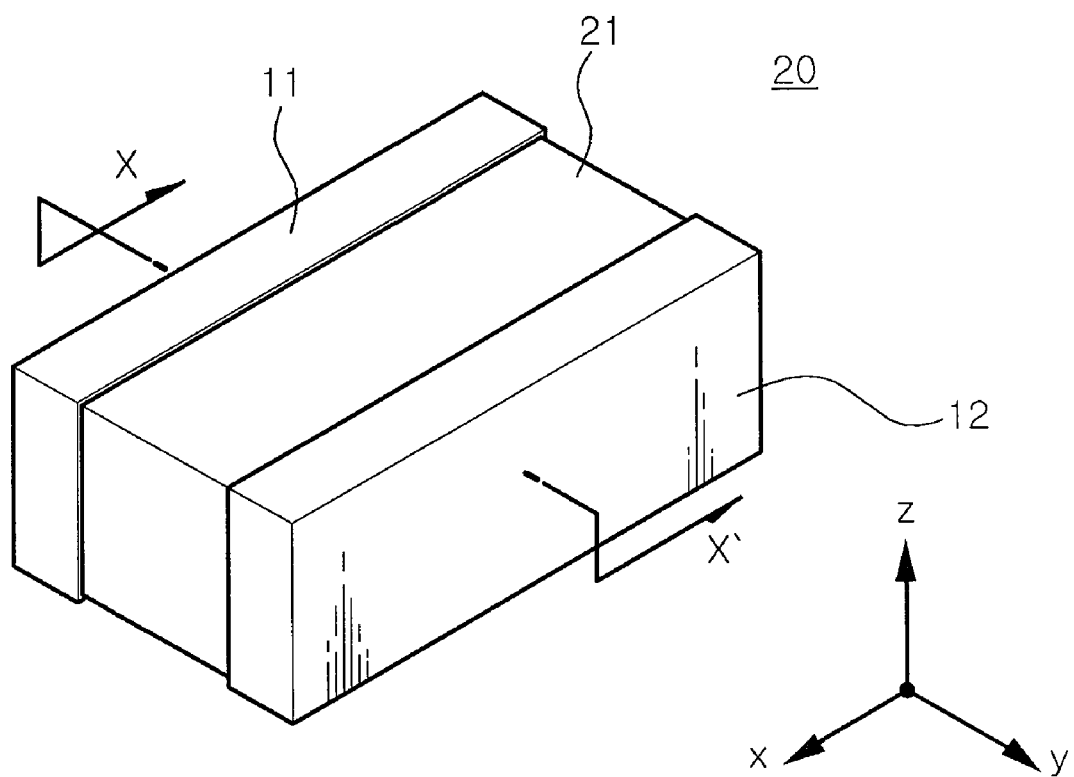
FIG. 1A is a perspective view of an exterior of a related art 2-terminal low inductance chip capacitor (LICC)

Exemplary embodiments of the present invention will now be described in detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

Figure 2:
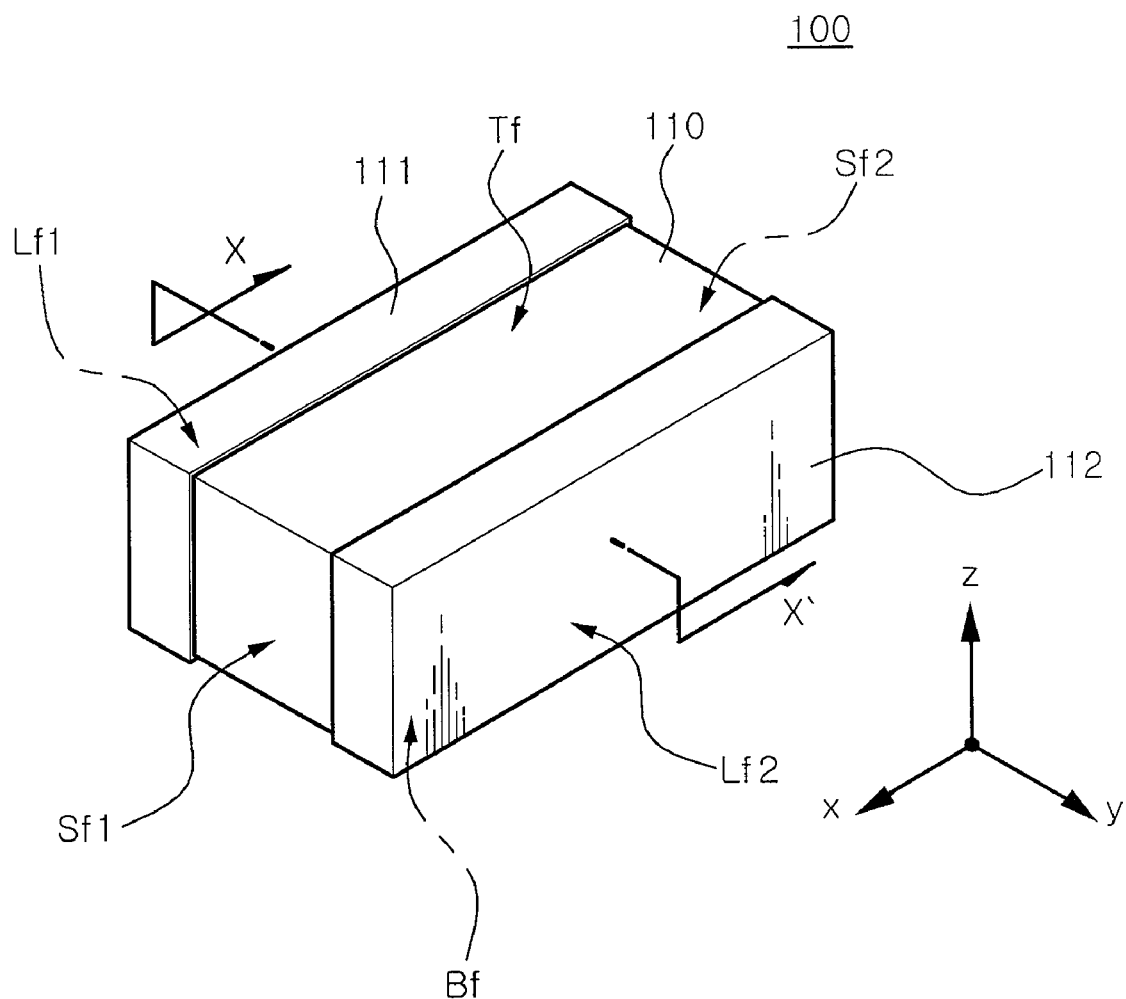
FIG. 2 is a perspective view of an exterior of a multilayer chip capacitor according to an exemplary embodiment of the present invention.
Figure 3:
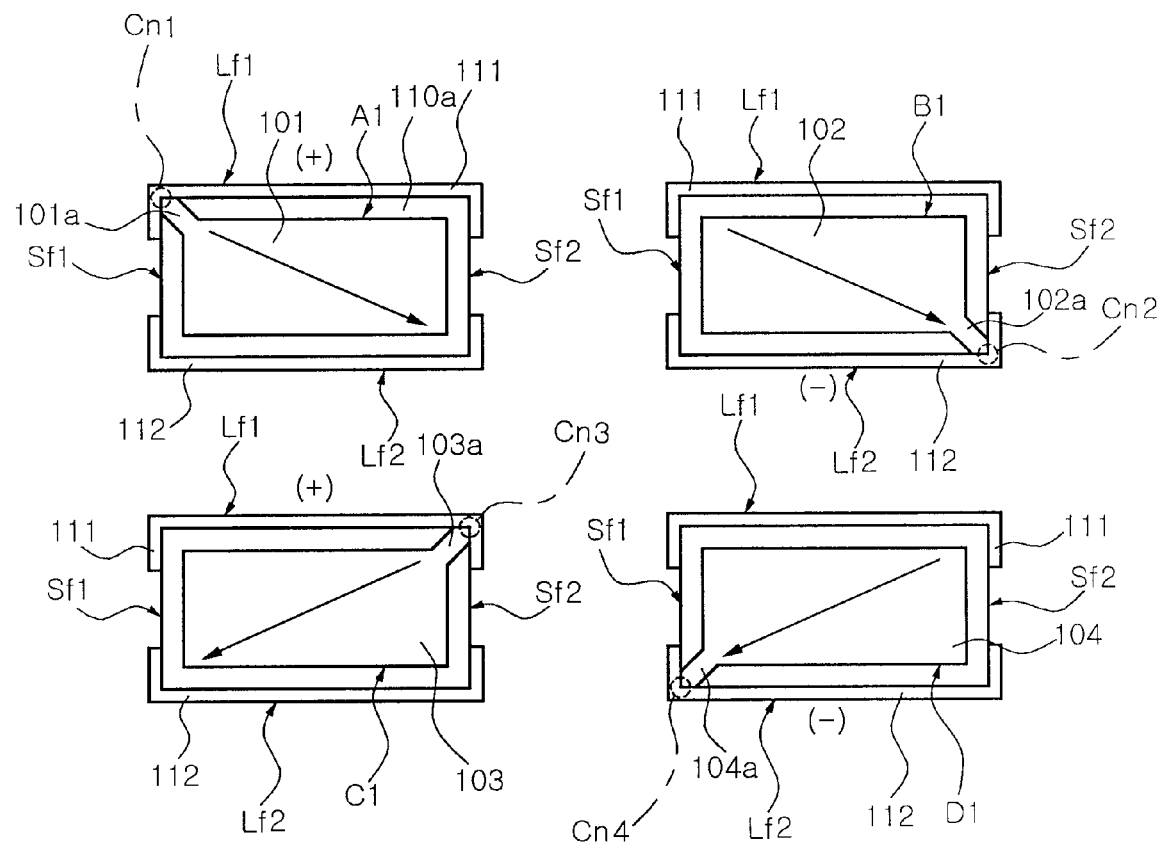
FIG. 3 is a cross-sectional view of an internal electrode structure of the multilayer chip capacitor of FIG. 2.
Figure 4:
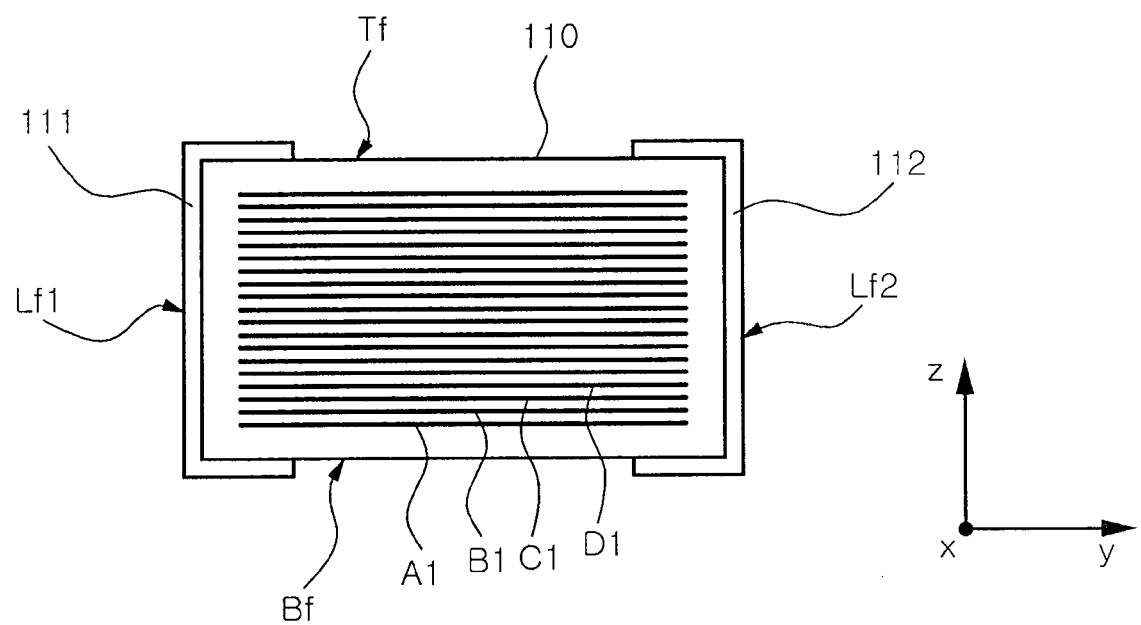
FIG. 4 is a sectional view taken along line X-X' of FIG. 2.

FIG. 2 is a perspective view of an exterior of a multilayer chip capacitor according to an exemplary embodiment of the present invention. FIG. 3 is a cross-sectional view of an internal electrode structure of the multilayer chip capacitor of FIG. 2. FIG. 4 is a sectional view taken along line X-X' of FIG. 2.

Referring to FIG. 2, a multilayer chip capacitor 100 includes a capacitor body 110 having a rectangular parallelepiped shape with a top surface Tf, a bottom surface Bf, first and second longer side surfaces Lf1 and Lf2 facing each other, and first and second shorter side surfaces Sf1 and Sf2 facing each other. The capacitor body 110 has a stacked structure of a plurality of dielectric layers (see 110a of FIG. 3) parallel to the top and bottom surfaces Tf and Bf. First and second external electrodes 111 and 112, which are two terminals of opposite polarities, are disposed at the first and second longer side surface Lf1 and Lf2 of the capacitor body 110, respectively. The first and second external electrodes 111 and 112 cover the longer side surfaces Lf1 and Lf2, respectively and partially extend to the top and bottom surfaces Tf and Bf and to the first and second shorter side surfaces Sf1 and Sf2.

Referring to FIGS. 2 through 4, the capacitor body 110 includes a plurality of dielectric layers 110a, at least one first internal electrode pair A1 and B1, and at least one second internal electrode pair C1 and D1. One first internal electrode pair A1 and B1 and one second internal electrode pair C1 and D1 may be stacked, or a plurality of first internal electrode pairs A1 and B1 may be stacked alternately with a plurality of second internal electrode pairs C1 and D1. The first internal electrode pair includes a first internal electrode A1 and a second internal electrode B1, which face each other with a dielectric layer 110a therebetween. The second internal electrode pair includes a third internal electrode C1 and a fourth internal electrode D1, which face each other with a dielectric layer 110a therebetween.

The first to fourth internal electrodes A1, B1, C1 and D1 are sequentially disposed in a stacked direction to form one block. According to the required capacity, one block may be stacked or a plurality of blocks may be stacked on top of one another. That is, internal electrodes are stacked on top of one another in the order of A1-B1-C1-D1-A1-B1-C1-D1- . . . , and in this case, the first to fourth internal electrodes A1 to D1 corresponding to one period of the periodic stacking form one block.

In the first internal electrode pair, the first internal electrode A1 includes a rectangular main part 101 and a first lead 101a, and the second internal electrode B1 includes a rectangular main part 102 and a second lead 102a. The main part 101 of the first internal electrode A1 and the main part 102 of the second internal electrode B1 face each other with a dielectric layer 110a therebetween, thereby generating a predetermined capacitance component. The first lead 101a of the first internal electrode A1 provides a connection between the first internal electrode A1 and the first external electrode 111, and the second lead 102a of the second internal electrode B1 provides a connection between the second internal electrode B1 and the second external electrode 112.

Particularly, the first lead 101a of the first internal electrode A1 extends to a first corner Cn1 at which the first longer side surface Lf1 of the capacitor body 110 meets the first shorter side surface Sf1, and is connected to the first external electrode 111 of one polarity, e.g., a positive (+) polarity. The second lead 102a of the second internal electrode B1 extends to a second corner Cn2 at which the second longer side surface Lf2 meets the second shorter side surface Sf2, and is connected to the second external electrode 112 of the other polarity, e.g., a negative (−) polarity. The first lead 101a and the second lead 102a respectively extend to the first and second corners Cn1 and Cn2, which diagonally face each other, and are respectively disposed at an end of the main part 101 and an end of the main part 102, which diagonally face each other.

In the second internal electrode pair, the third internal electrode C1 includes a rectangular main part 103 and a third lead 103a, and the fourth internal electrode D1 includes a rectangular main part 104 and a fourth lead 104a. The main part 103 of the third internal electrode C1 and the main part 104 of the fourth internal electrode D1 face each other with a dielectric layer 110a therebetween, thereby generating a predetermined capacitance component. The third lead 103a of the third internal electrode C1 provides a connection between the third internal electrode C1 and the first external electrode 111, and the fourth lead 104a of the fourth internal electrode D1 provides a connection between the fourth internal electrode D1 and the second external electrode 112.

Particularly, the third lead 103a of the third internal electrode C1 extends to a third corner Cn3 at which the first longer side surface Lf1 of the capacitor body 110 meets the second shorter side surface Sf2, and is connected to the first external electrode 111 of one polarity. The fourth lead 104a of the fourth internal electrode D1 extends to a fourth corner Cn4 at which the second longer side surface Lf2 meets the first shorter side surface Sf1, and is connected to the second external electrode 112 of the other polarity. The third lead 103a and the fourth lead 104a respectively extend to the third and fourth corners Cn3 and Cn4, which diagonally face each other, and are respectively disposed at an end of the main part 103 and an end of the main part 104, which diagonally face each other.

Figure 1B:
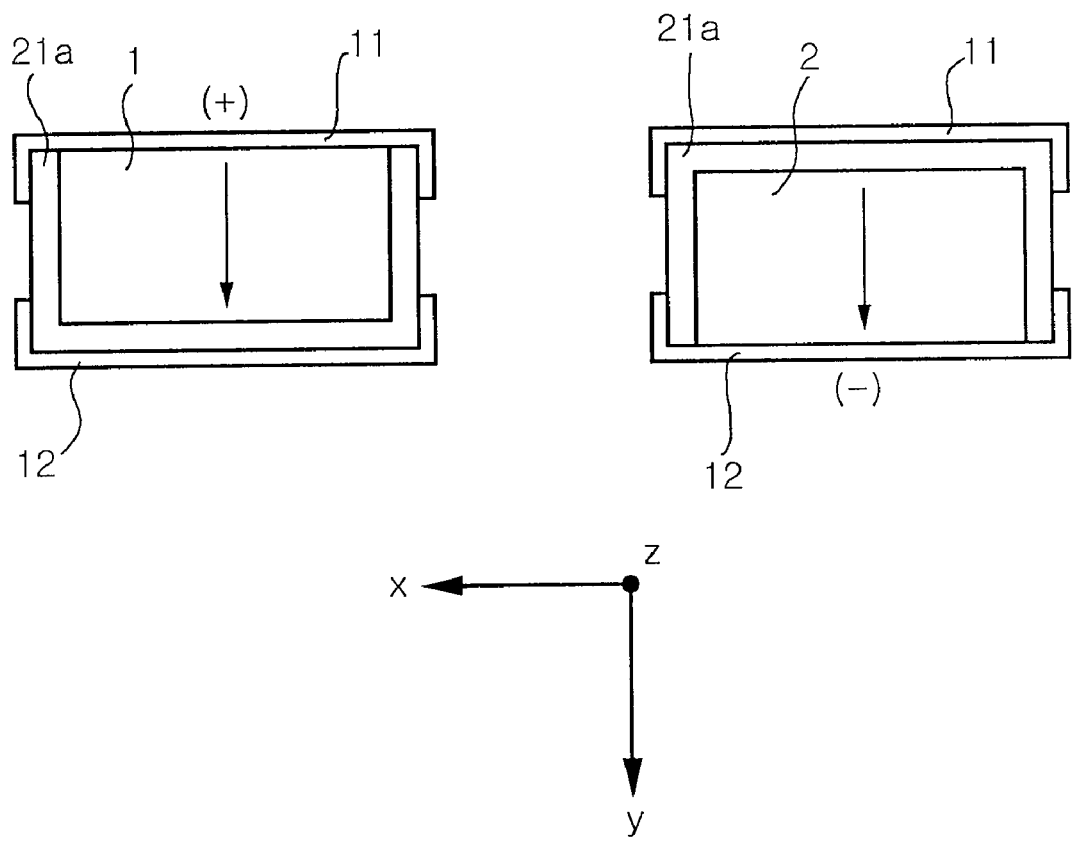
FIG. 1B is a cross-sectional view taken along a plane perpendicular to they-axis of FIG. 1A, illustrating an internal electrode structure of the 2-terminal LICC of FIG. 1A.

During the capacitor operation, the current flows from the first lead 101a of the positive polarity to the second lead 102a of the negative polarity. Accordingly, as indicated by arrows in FIG. 3, the first internal electrode pair A1 and B1 causes a current to diagonally flow from the first corner Cn1 toward the second corner Cn2. Also, as indicated by arrows in FIG. 3, the second internal electrode pair C1 and D1 causes a current to diagonally flow from the third corner Cn3 toward the fourth corner Cn4. Thus, as compared to FIG. 1B, connection portions between the internal and external electrodes decrease in width and current paths are diagonally elongated, thereby greatly increasing equivalent series resistance (ESR) of the multilayer chip capacitor. Besides, the current paths are increased not just in the main parts 101 to 104 but also in the first to fourth leads 101a to 104a of the first to fourth internal electrodes A1 to D1. This is because the first to fourth leads 101a to 104a extend diagonally or in a direction inclined with respect to the main parts 101 to 104 of the first to fourth internal electrodes A1 to D1, respectively.

The current flow at the first internal electrode pair A1 and B1 is in a direction opposite to that of the current flow at the second internal electrode pair C1 and D1, with respect a long side direction (i.e., an x-axial direction) of the main parts 101 to 104. Accordingly, the flux generated by the current of the first internal electrode pair A1 an B1 considerably cancels the flux generated by the current of the second internal electrode pair C1 and D1, so that an increase in equivalent series inductance (ESL) caused by the elongation of the current path can be suppressed. The fine adjustment of the ESL and ESR can be achieved by controlling a width and length of each of the respective first to fourth leads 101a to 104a of the first to fourth internal electrodes A1 to D1.

According to the current embodiment of the present invention, high ESR can be achieved, and an increase in ESL can be suppressed. Also, connectivity between internal and external electrodes can be improved because of the leads, and ESR variations in manufactured multilayer chip capacitors can be reduced. In a process of manufacturing multilayer chip capacitors, a body chip is polished to expose the lead to the outside after a capacitor body is formed and before the external electrode is applied. At the time of polishing the body chip, a corner portion of the body is polished more easily than a central portion of a side surface of the body. Accordingly, the lead extending to the corner is exposed by polishing the body chip such that contact between the internal and external electrodes can be secured after a subsequent process of forming the external electrode, insufficient connectivity between the internal and external electrodes can be prevented, and the ESR variations can be reduced.

Figure 5:
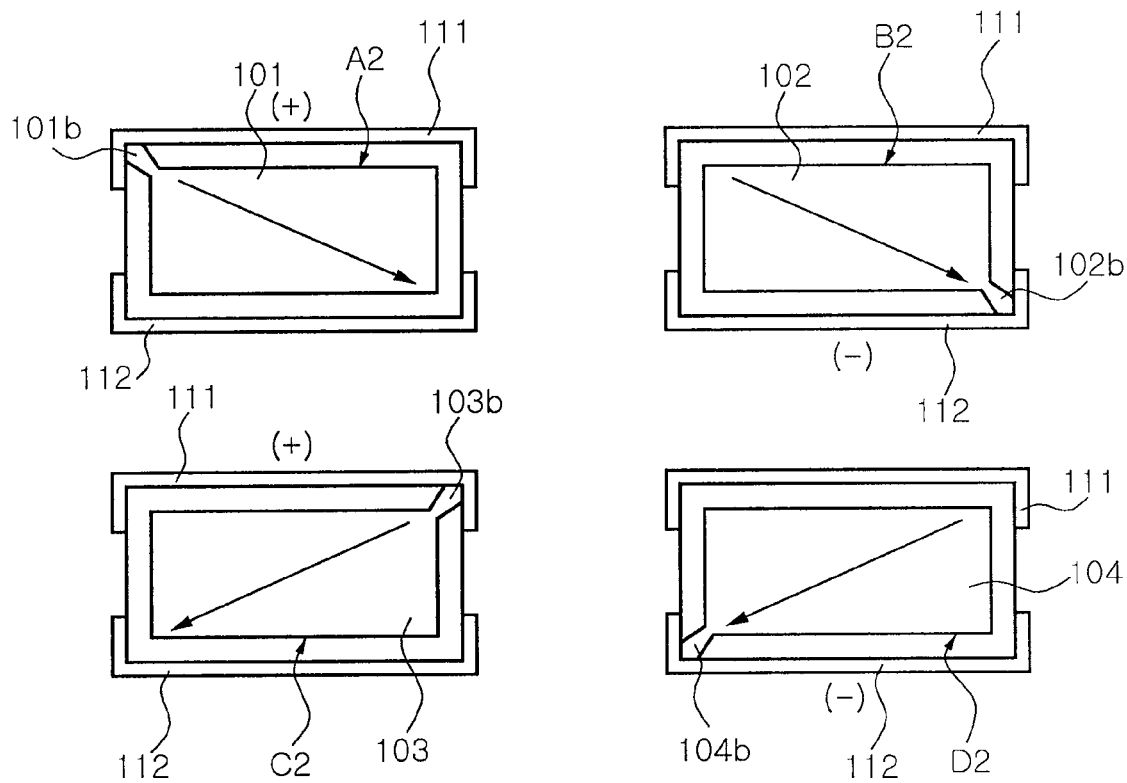
FIG. 5 is a cross-sectional view of an internal electrode structure of a multilayer chip capacitor according to another exemplary embodiment of the present invention.
Figure 6:
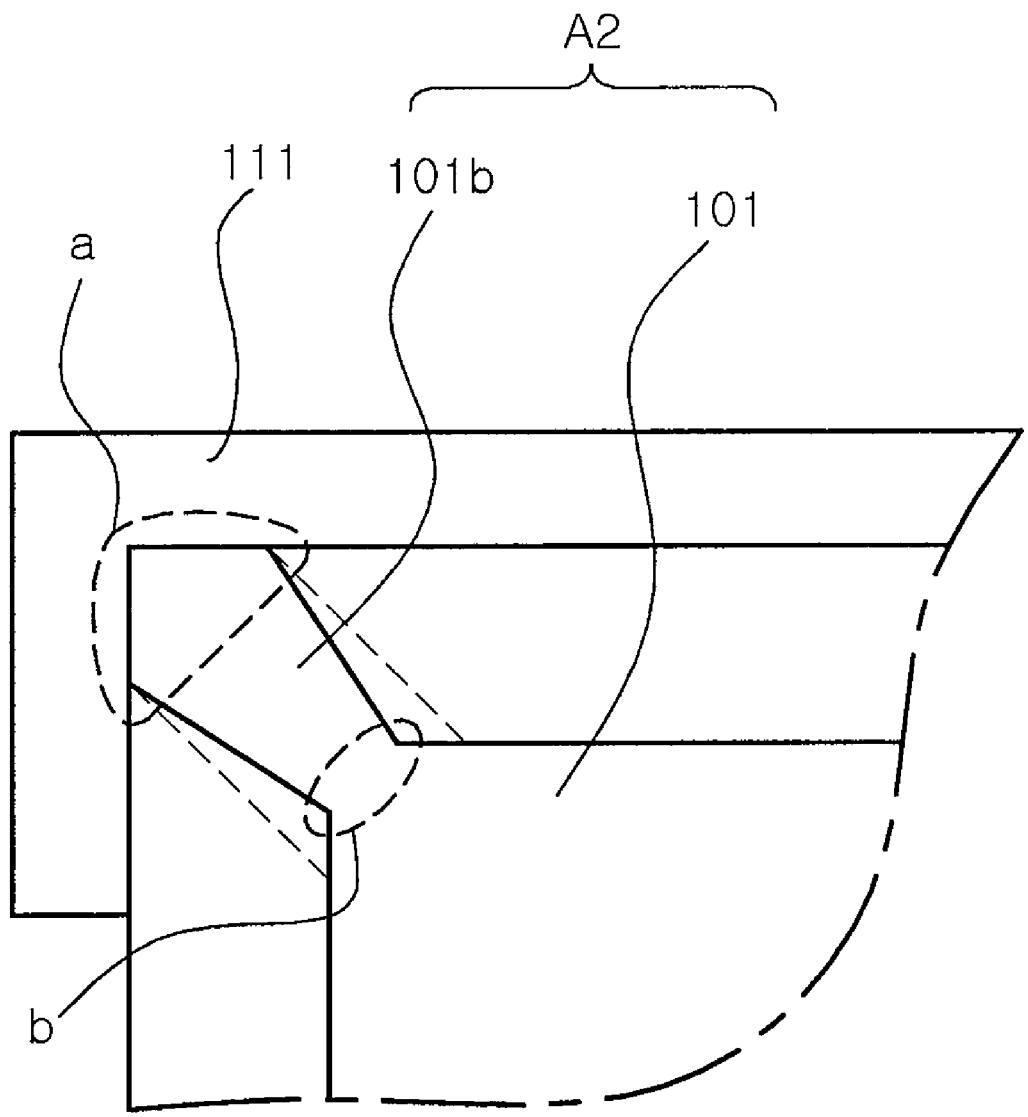
FIG. 6 is a partial enlarged view illustrating a lead of an internal electrode of FIG. 5.

FIG. 5 is a cross-sectional view of an internal electrode structure of a capacitor according to another exemplary embodiment of the present invention. FIG. 6 is an enlarged view of a lead portion of an internal electrode of FIG. 5. A capacitor having the internal electrode structure illustrated in FIG. 5 has the same exterior as illustrated in FIG. 2. The current embodiment of FIG. 5 is identical to the previous embodiment of FIG. 3 with regard to a connection relation between an internal electrode and an external electrode, disposition of each lead, and diagonal current flow in each of first and second internal electrode pairs. Here, the current flow at the first internal electrode pair is in a direction opposite to that of the current flow at the second internal electrode pair in a long side direction.

According to the embodiment of FIG. 5, a first lead 101$b$ of a first internal electrode A2 is gradually tapered from a connection portion connected with a first external electrode 111 toward a main part 101 of the first internal electrode A2. A second lead 102$b$ of a second internal electrode A2 is gradually tapered from a connection portion connected with a second external electrode 112 toward a main part 102 of the second internal electrode B2. A third lead 103$b$ of a third internal electrode C2 is also gradually tapered from a connection portion connected with the first external electrode 111 toward a main part 103 of the third internal electrode C2. A fourth lead 104 of a fourth internal electrode D2 is also gradually tapered from a connection portion connected with the second external electrode 112 toward a main part 104 of the fourth internal electrode D2. An example of such leads is illustrated in detail in the enlarged view of FIG. 6. As shown in FIG. 6, the first lead 101$b$ of the first internal electrode A2 is gradually tapered from a connection portion 'a' connected with the first external electrode 111 toward a connection portion 'b' connected with the main part 101 of the first internal electrode A1.

Thus, the width of the first lead 101$b$ is smaller at the connection portion 'b' connected with the main part 101 than at the connection portion 'a' connected with the first external electrode 111. Accordingly, ESR of the multilayer chip capacitor can further increase because the current path decreases in width at the connection portion 'b' between the main part 101 and the first lead 10$b$, while sufficient electrical connectivity is maintained at the connection portion 'a' between the first external electrode 111 and the first lead 101$b$.

Figure 8:
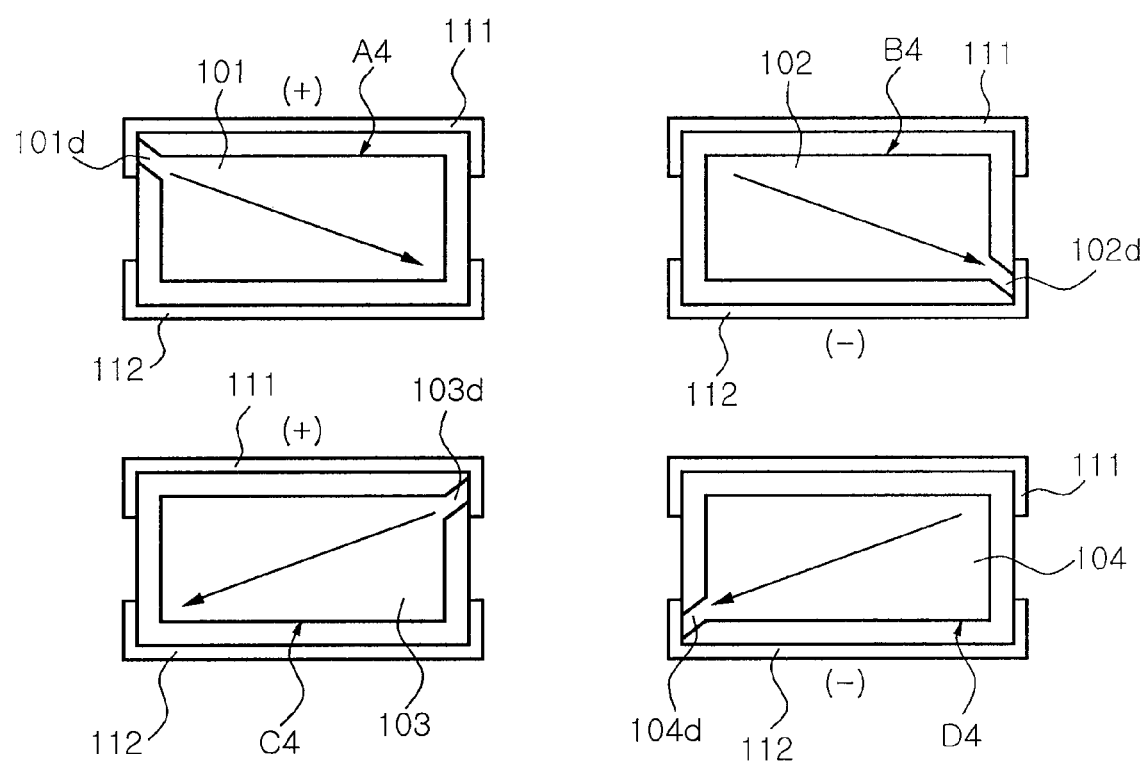
FIG. 8 is a cross-sectional view of an internal electrode structure of a multilayer chip capacitor according to yet another exemplary embodiment of the present invention.
Figure 9:
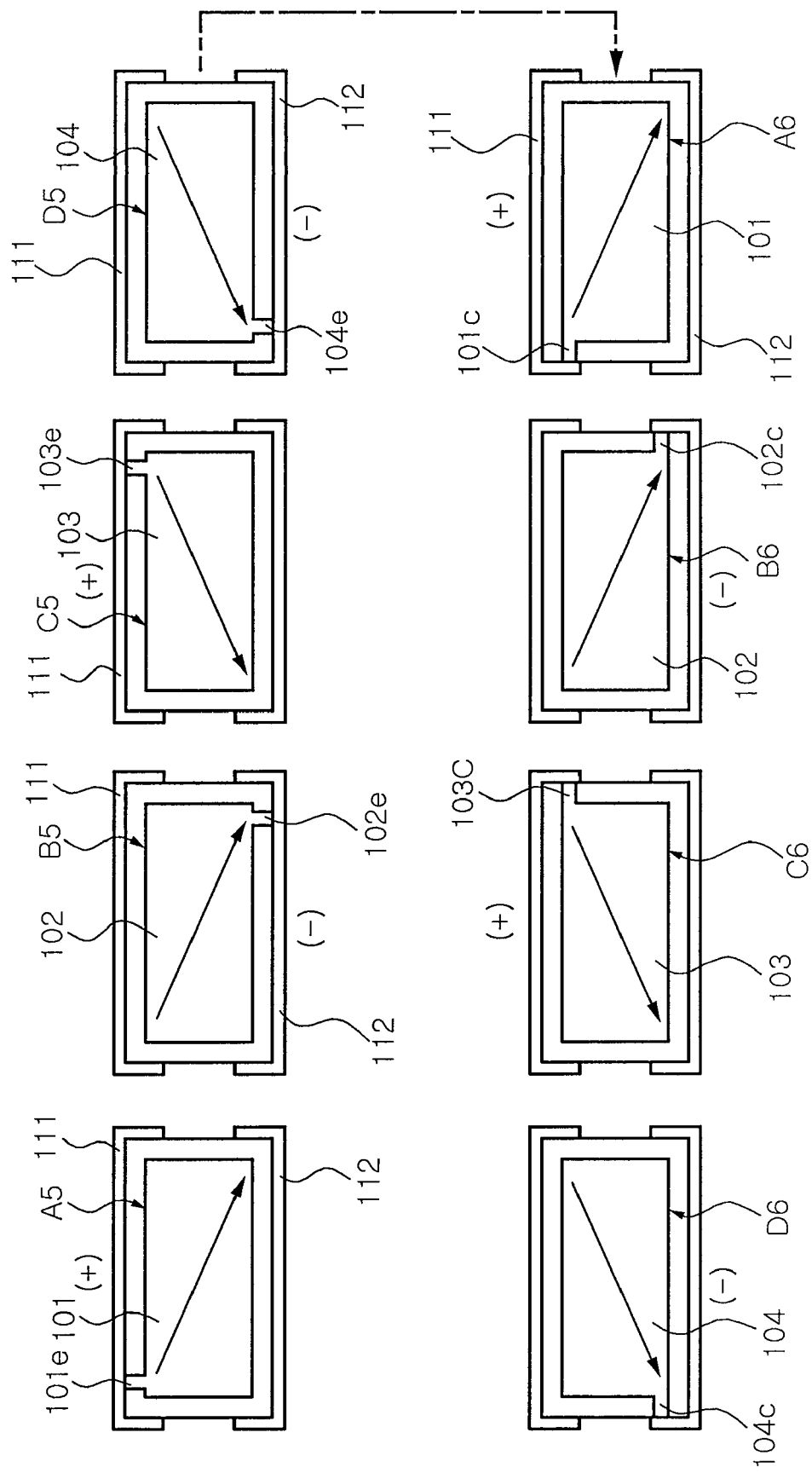
FIG. 9 is a cross-sectional view of an internal electrode structure of a multilayer chip capacitor according to a further exemplary embodiment of the present invention.

According to other exemplary embodiments of the present invention, a lead of an internal electrode may not necessarily extend to the center of a corner of a capacitor body. For example, the lead may extend to a portion of a shorter side surface or a longer side surface, which is adjacent to the corner of the capacitor body. Exemplary embodiments in this regard are illustrated in FIGS. 7 through 9.

Figure 7:
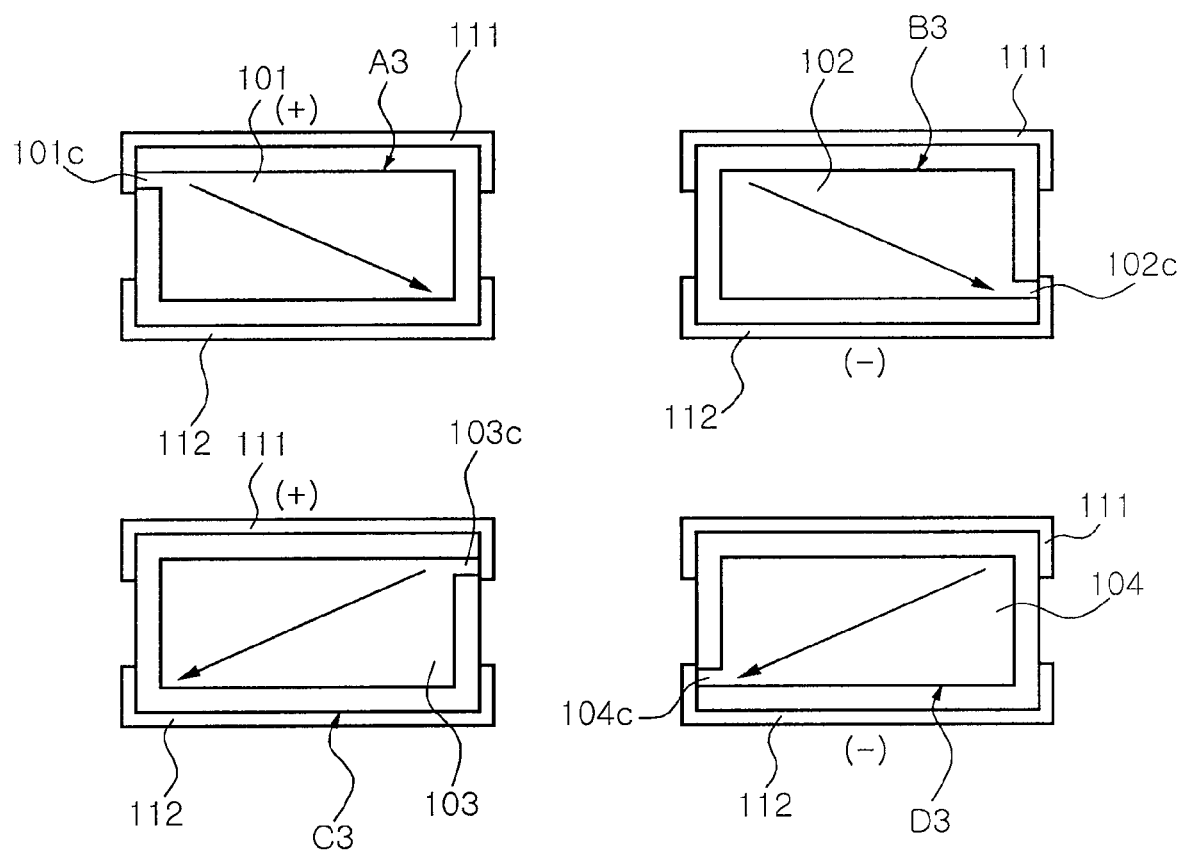
FIG. 7 is a cross-sectional view of an internal electrode structure of a multilayer chip capacitor according to still another exemplary embodiment of the present invention.

FIG. 7 is a cross-sectional view of an internal electrode structure of a multilayer chip capacitor according to still another embodiment of the present invention. FIG. 8 is a cross-sectional view of an internal electrode structure of a multilayer chip capacitor according to yet another embodiment of the present invention. The embodiments of FIGS. 7 and 8 are also identical to the previous embodiment with regard to an exterior of a capacitor, a connection relation between internal and external electrodes and diagonal current flow in a main part of the internal electrode. However, the difference there is that, according to the embodiments of FIGS. 7 and 8, a lead extends toward a portion of a shorter side surface, which is adjacent to a corner of a capacitor body, rather than to the corner.

Referring to FIG. 7, a first lead 101$c$ of a first internal electrode A3 extends to a portion of a shorter side surface, which is adjacent to a first corner of a capacitor body, and is connected to the first external electrode 111. A second lead 102$c$ of a second internal electrode B3 extends to a portion of a shorter side surface, which is adjacent to a second corner diagonally facing the first corner, and is connected to the second external electrode 112. Also, a third lead 103$c$ of a third internal electrode C3 extends to a portion of the shorter side surface, which is adjacent to a third corner that faces the first corner in a long side direction, and is connected to the first external electrode 111. A fourth lead 104$d$ of a fourth internal electrode D3 extends to a portion of the shorter side surface, which is adjacent to a fourth corner diagonally facing the third corner, and is connected to the second external electrode 112.

As indicated by arrows in FIG. 7, the current flow at a first internal electrode pair A3 and B3 is in a direction opposite to that of the current flow at a second internal electrode pair C3 and D3 with regard to a long side direction. Accordingly, the ESR increases because of the diagonally elongated current path, and an increase in ESL is suppressed because of the current flows in the opposite directions.

According to the embodiment of FIG. 8, first to fourth leads 101$d$ to 104$d$ of first to fourth internal electrodes A4 to D4 extend toward corners, inclined at a predetermined angle with respect to main parts 101 to 104 of the first to fourth internal electrodes A4 to D4, respectively. The first to fourth leads 101$d$ to 104$d$ of FIG. 8 are closer to the respective corresponding corners than the first to fourth leads 101$c$ to 104$c$ of FIG. 7. Accordingly, the first to fourth leads 101$d$ to 104$d$ are prevented from being exposed outside the first and second external electrodes 111 and 112, and connectivity between the lead and the external electrode can be improved. Besides, as the first to fourth leads 101$d$ to 104$d$ are inclined, current paths increase in length at the first to fourth leads 101$d$ to 104$d$, respectively.

Figure 10:
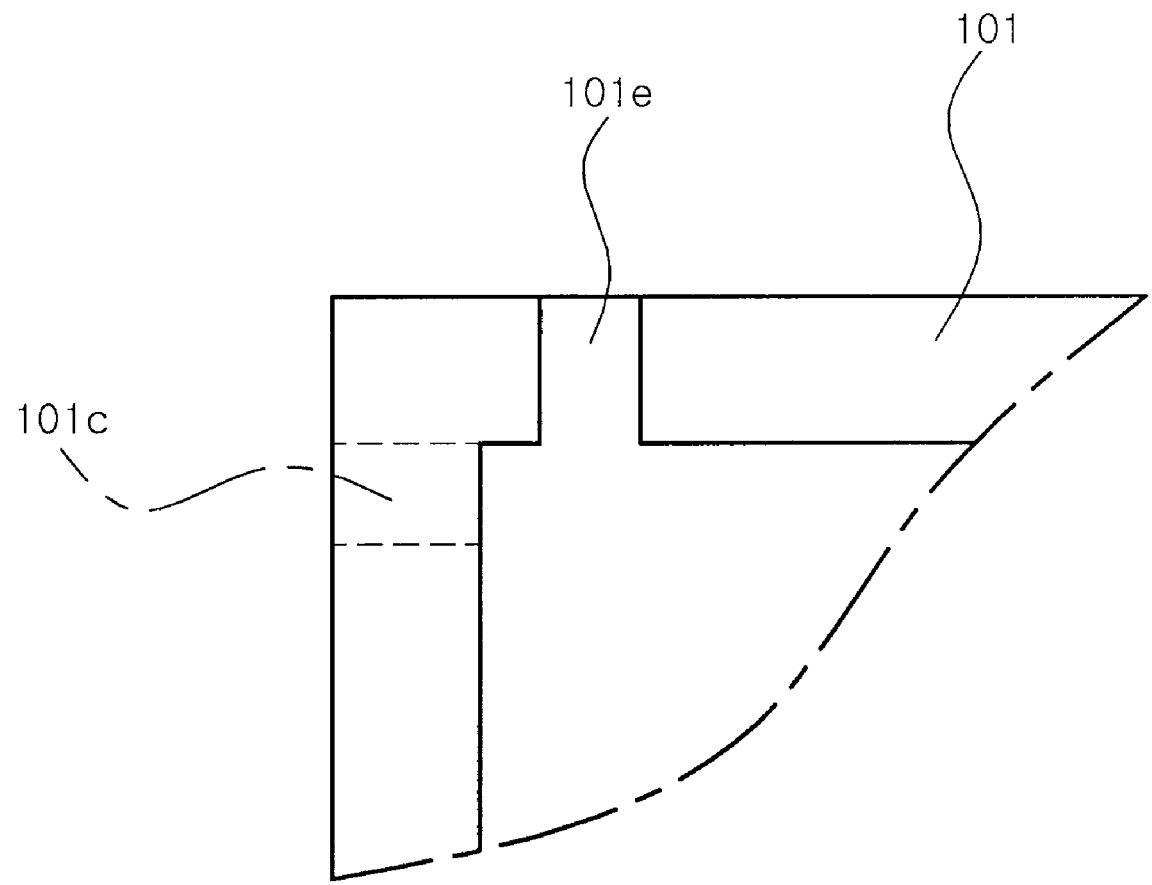
FIG. 10 is a partial enlarged view illustrating lead disposition of an internal electrode of FIG. 9.

FIG. 9 is a cross-sectional view of an internal electrode structure of a multilayer chip capacitor according to a further exemplary embodiment of the present invention. FIG. 10 is an enlarged view of a portion of an internal electrode of FIG. 9, illustrating lead disposition. The embodiment of FIG. 9 is also identical to the previous embodiment with regard to an exterior of a capacitor, a connection relation between internal and external electrodes and diagonal current flow in a main part of the internal electrode. However, the difference there is that, according to the embodiment of FIG. 9, leads of the same polarity that are adjacent vertically, i.e., in a stacked direction may extend in different directions forming a predetermined angle therebetween.

Referring to FIG. 9, first to eighth internal electrodes A5, B5, C5, D5, A6, B6, C6 and D6 are sequentially disposed. First and second leads 101$e$ and 102$e$ of a first internal electrode pair A5 and B5 extend to portions of longer side surfaces, which are adjacent to corresponding corners, respectively. Third and fourth leads 103$e$ and 104$e$ of a second internal electrode pair C5 and D5 also extend to portions of the longer side surfaces, which are adjacent to corresponding corners, respectively. Fifth and sixth leads 101$c$ and 102$c$ of a third internal electrode pair A6 and B6 extend to portions of shorter side surfaces, which are adjacent to the corresponding corners, respectively. Seventh and eighth leads 103$c$ and 104$c$ of a fourth internal electrode pair C6 and D6 extend to portions of the shorter side surfaces, which are adjacent to the corresponding corners, respectively.

As indicated by arrows in FIG. 9, the first internal electrode pair A5 and B5 and the second internal electrode pair C5 and D5 cause a current to diagonally flow in opposite directions with respect to a long side direction. Likewise, the third internal electrode pair A6 and B6 and the fourth internal electrode pair C6 and D6 cause the current to diagonally flow in opposite directions with respect to a long side direction.

As shown in FIGS. 9 and 10, the first lead 101e of the first internal electrode A5 and the fifth lead 101c of the fifth internal electrode A6, which have the same polarity, e.g., the positive polarity, extend in different directions forming a predetermined angle, i.e., an angle of approximately 90 degrees therebetween. The second lead 102e of the second internal electrode B5 and the sixth lead 102c of the sixth internal electrode B6, which have the same polarity, e.g., the negative polarity, also extend in different directions forming a predetermined angle therebetween. In the same manner, the fourth lead 104e and the eighth lead 104c of, e.g., the negative polarity extend in different directions forming a predetermined angle therebetween.

The leads (e.g., the first and fifth leads 101e and 101c) of the same polarity, which are vertically adjacent to each other, extend in different directions. Such lead disposition contributes to reducing the ESL because of the mutual inductance of the leads having the same polarity.

Figure 11:
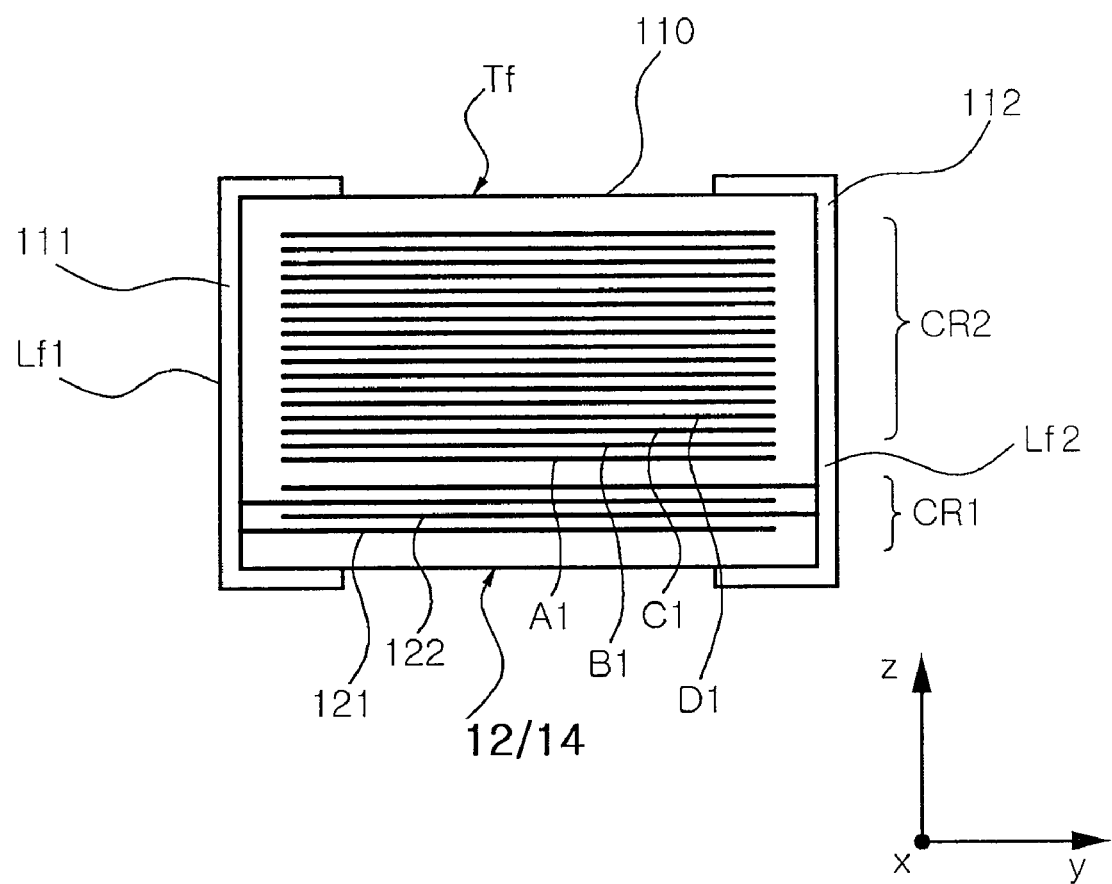
FIG. 11 is a sectional view taken along line X-X' of FIG. 2, illustrating a multilayer chip capacitor according to a still further exemplary embodiment of the present invention.
Figure 12:
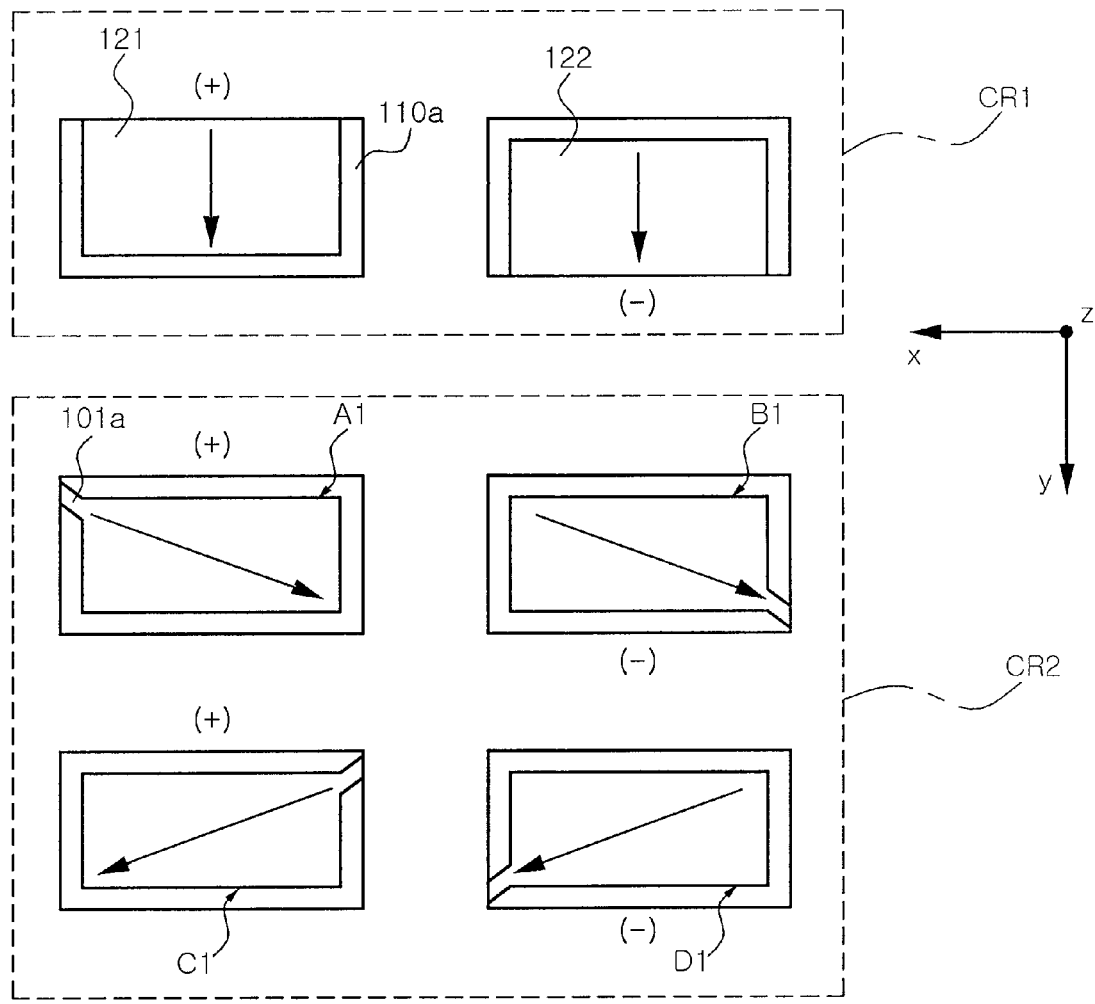
FIG. 12 is a plan view of an internal electrode structure of the multilayer chip capacitor of claim 11.

FIG. 11 is a sectional view taken along line X-X' of FIG. 12, illustrating a multilayer chip capacitor according to a still further exemplary embodiment of the present invention. FIG. 12 is a plan view of an internal electrode structure of the multilayer chip capacitor of FIG. 11. An exterior of the multilayer chip capacitor of FIG. 11 is the same as that illustrated in FIG. 2. According to the embodiment of FIGS. 11, and 12, the internal electrode structure of FIG. 3 is used together with an internal electrode structure of the related art low-inductance chip capacitor (LICC) of FIG. 1B.

Referring to FIGS. 11 and 12, rectangular internal electrodes 121 and 122 of the related art LICC are disposed at a lower end within the capacitor body 110, thereby forming a first capacitor part CR1. The rectangular internal electrodes 121 and 122 are respectively connected to the first and second external electrodes 111 and 112 over their entire lengths. The first to fourth internal electrodes A1 to D1 of the embodiment of FIG. 3 are disposed on the first capacitor part CR1, thereby forming a second capacitor part CR2. If necessary, the rectangular internal electrodes 121 and 122 may be alternately disposed, and the first and second internal electrode pairs A1 and B1 and C1 and D1 may also be alternately disposed. A bottom surface Bf or the lower end of the capacitor body 110 corresponds to a side adjacent to a mounting surface in the case where the capacitor is mounted. A top surface Tf or an upper end of the capacitor body 110 corresponds to the opposite side to the bottom surface Bf or the lower end. The stacked order of internal electrodes is 121-122-121-122- . . . -A1-B1-C1-D1-A1-B1- . . . from an internal electrode closest to the mounting surface of the capacitor.

Because of large contact areas between internal and external electrodes and short current paths, the pair of rectangular internal electrodes 121 and 122 can provide lower ESL than ESL per layer provided by the first or second internal electrode pair A1 and B1 or C1 and D1. Here, the ESL per layer refers to ESL provided by two internal electrodes that closely face each other with a dielectric layer therebetween. Also, because of elongated diagonal current paths, the first or second internal electrode pair A1 and B1 or C1 and D1 can provide higher ESR than ESR per layer provided by the pair of rectangular internal electrodes 121 and 122. Here, the ESR per layer refers to ESR provided by two internal electrodes that closely face each other with a dielectric layer therebetween. The ESR of the entire capacitor can be controlled by controlling the number of rectangular internal electrodes 121 and 122, and the number of internal electrodes A1, B1, C1 and D1.

The rectangular internal electrodes 121 and 122 having the low ESL are disposed at the lowest end, and the internal electrodes A1, B1, C1 and D1 are disposed thereon. In this case, the current flowing in the capacitor at a high frequency concentrates at the rectangular internal electrodes 121 and 122 which has low ESL per layer and is disposed at the lower end. For this reason, a substantial current path generated by a current loop decreases in length, thereby implementing a 2-terminal LICC that achieves greatly increased ESR while maintaining the entire ESL at a low level similar to that of the related art LICC of FIG. 1B.

Figure 13:
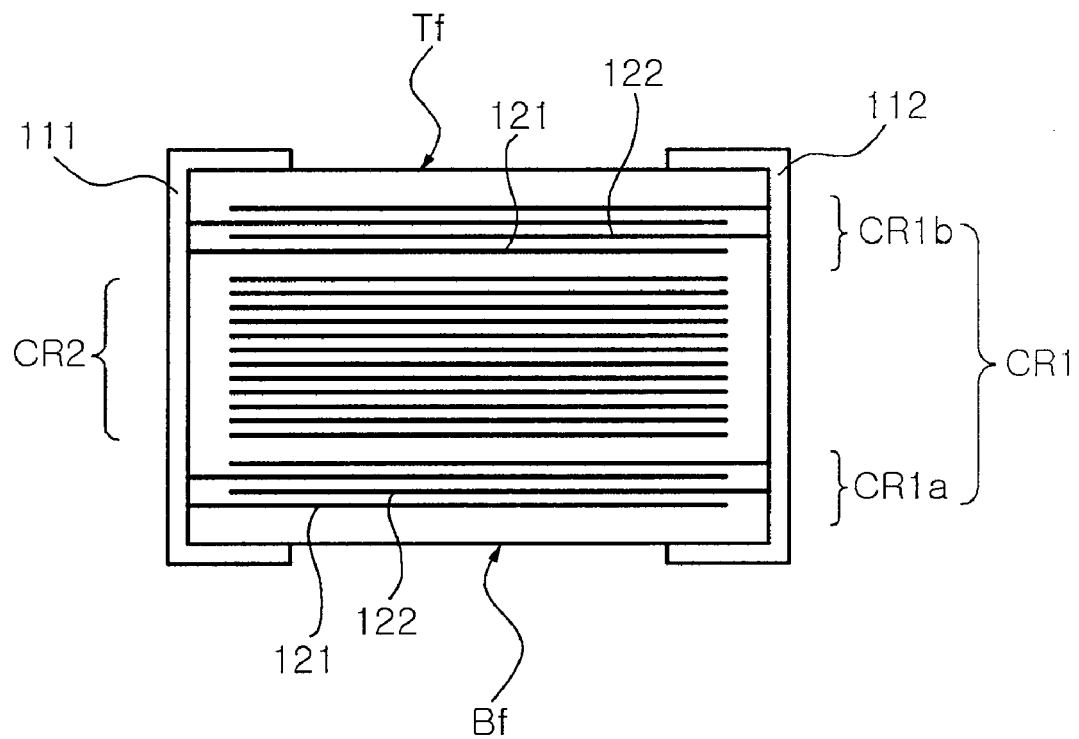
FIG. 13 is a sectional view taken along line X-X' of FIG. 2, illustrating a multilayer chip capacitor according to a yet further exemplary embodiment of the present invention.

FIG. 13 is a sectional view taken along line X-X' of FIG. 2, illustrating a multilayer chip capacitor according to a yet further exemplary embodiment of the present invention. The embodiment of FIG. 13 corresponds to a structure in which another first capacitor part is stacked on the second capacitor part CR2 of FIG. 11.

Referring to FIG. 13, two first capacitor parts CR1 are respectively disposed at an upper end and a lower end in the capacitor body 110, and the second capacitor part CR2 is disposed between the upper and lower first capacitor parts CR1a and CR1b. In each of the upper and lower first capacitor parts CR1a and CR1b, typical rectangular internal electrodes 121 and 122 are alternately disposed. In the second capacitor part CR2, the first to fourth internal electrodes A1, B1, C1 and D1 of FIG. 3 are disposed (see FIG. 12). The order of internal electrodes is 121-122-121-122- . . . -A1-B1-C1-D1-A1-B1- . . . -121-122-121-122- . . . from an internal electrode closest to the mounting surface.

Particularly, the upper and lower first capacitor parts CR1a and CR1b are symmetrically disposed, so that upper and lower portions of the multilayer chip capacitor can be symmetrical to each other. Because the symmetry can be secured in mounting the capacitor, the multilayer chip capacitor can be mounted to the mounting surface without distinguishing between the top surface and the bottom surface of the multilayer chip capacitor. According to the current embodiment of FIG. 13, the current flowing in the multilayer chip capacitor at a high frequency also concentrates at the rectangular internal electrodes 121 and 122 of the related art LICC, thereby implementing a 2-terminal LICC that has greatly increased ESR while maintaining the ESL to a level similar to that of the related art LICC. As in the embodiment of FIG. 11, the ESR of the entire multilayer chip capacitor can be controlled by controlling the number of rectangular internal electrodes 121 and 122 and the number of internal electrodes A1, B1, C1 and D1.

Figure 14:
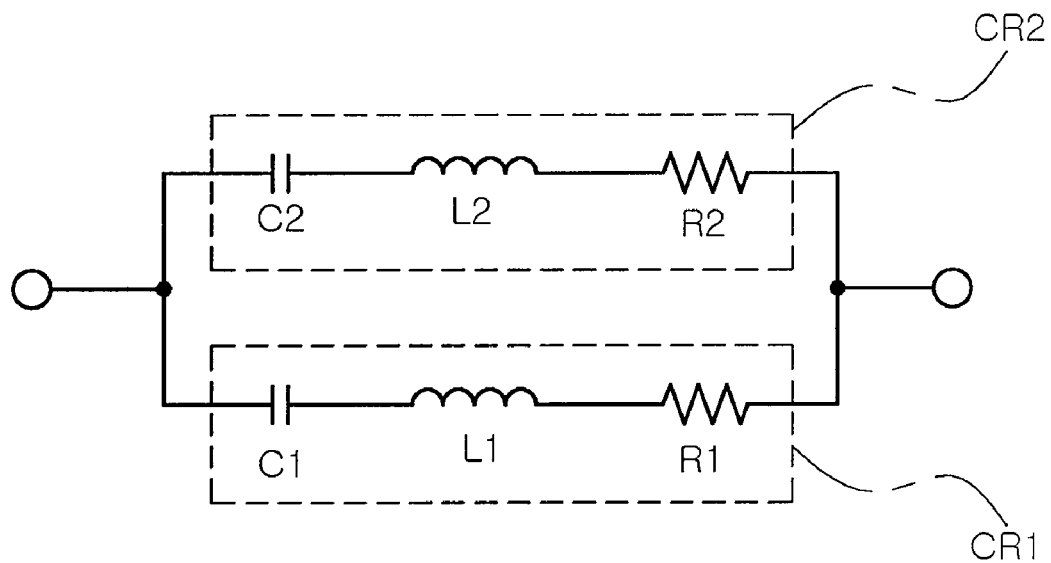
FIG. 14 is an equivalent circuit diagram of the multilayer chip capacitors of FIGS. 11 and 13.

FIG. 14 is an equivalent circuit diagram of the multilayer chip capacitors of FIGS. 11 and 13. As shown in FIG. 14, the equivalent circuit of the first capacitor part CR1 is expressed as a series circuit including electrostatic capacitance C1, inductance L1 and resistance R1. The equivalent circuit of the second capacitor part CR2 may also be expressed as a series circuit including electrostatic capacitance C2, inductance L2 and resistance R2. The first capacitor part CR1 and the second capacitor part CR2 are connected in parallel through the first and second external electrodes 111 and 121. As mentioned above, a component per layer of the inductance L1, i.e., the ESL per layer of the first capacitor part CR1, becomes lower than a component per layer of the inductance L2, i.e., the ESL per layer of the second capacitor part CR2. A component per layer of the resistance R2, i.e., the ESR per layer of the second capacitor part CR2, becomes higher than a component per layer of the resistance R1, i.e., the ESR per layer of the first capacitor part CR1.

According to the exemplary embodiments of FIGS. 11 and 13, the internal electrode structure A1-B1-C1-D1 of FIG. 3 is used as the second capacitor part CR2. However, the present invention is not limited thereto, and one of the internal electrode structures A2 to D2, A3 to D3, A4 to D4 and A5 to D6 of FIGS. 5 to 9 can be used as the second capacitor part CR2 having increased ESR.

According to the embodiments of the present invention, a low inductance chip capacitor (LICC) that achieves high ESR while minimizing an increase in ESL can be implemented. Since a lead of each internal electrode extends to a corner of a chip, connectivity between the internal and external electrodes is improved in a process of manufacturing multilayer chip capacitors. Accordingly, ESR variations in the manufactured multilayer chip capacitors can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
   a capacitor body having a stacked structure of a plurality of dielectric layers and including first and second longer side surfaces facing each other and first and second shorter side surfaces facing each other;
   a first external electrode and a second external electrode having different polarities and disposed at the first longer side surface and the second longer side surface, respectively;
   one or more first internal electrode pairs each including a first internal electrode and a second internal electrode facing each other in the capacitor body with a dielectric layer therebetween; and
   one or more second internal electrode pairs each including a third internal electrode and a fourth internal electrode facing each other in the capacitor body with a dielectric layer therebetween,
   wherein:
   the first to fourth internal electrodes each have one lead and are sequentially disposed in a stacked direction,
   the first internal electrode has a first lead extending to a first corner at which the first longer side surface meets the first shorter side surface or to a portion adjacent to the first corner, the first lead being connected to the first external electrode,
   the second internal electrode has a second lead extending to a second corner diagonally facing the first corner or a portion adjacent to the second corner, the second lead being connected to the second external electrode,
   the third internal electrode has a third lead extending to a third corner at which the first longer side surface meets the second shorter side surface or a portion adjacent to the third corner, the third lead being connected to the first external electrode,
   the fourth internal electrode has a fourth lead extending to a fourth corner diagonally facing the third corner or a portion adjacent to the fourth corner, the fourth lead being connected to the second external electrode, and
   the first internal electrode pair causes current to flow only from the first corner toward the second corner along a first diagonal direction, and the second internal electrode pair causes current to flow only from the third corner toward the fourth corner along a second diagonal direction.

2. The multilayer chip capacitor of claim 1, wherein the first to fourth leads extend to the first to fourth corners, respectively.

3. The multilayer chip capacitor of claim 2, wherein at least one of the first to fourth leads is gradually tapered from a connection portion connected with a corresponding one of the first and second external electrodes toward a connection portion connected with a main part of a corresponding one of the first to fourth internal electrodes.

4. The multilayer chip capacitor of claim 1, wherein the first lead and the second lead extend to portions of the first shorter side surface and the second shorter side surface, which are adjacent to the first corner and the second corner, respectively, and the third lead and the fourth lead extend to portions of the second shorter side surface and the first shorter side surface, which are adjacent to the third corner and the fourth corner, respectively.

5. The multilayer chip capacitor of claim 4, wherein the first to fourth leads extend toward the first to fourth corners, inclined at predetermined angles to main parts of the first to fourth internal electrodes, respectively.

6. The multilayer chip capacitor of claim 1, further comprising:
   a third internal electrode pair including a fifth internal electrode and a sixth internal electrode facing each other in the capacitor body with a dielectric layer therebetween; and
   a fourth internal electrode pair including a seventh internal electrode and an eighth internal electrode facing each other in the capacitor body with a dielectric layer therebetween,
   wherein the fifth to eighth internal electrodes each have one lead, and the first to eighth internal electrodes are sequentially disposed in a stacked direction,
   the fifth internal electrode has a fifth lead extending to the first corner or a portion adjacent to the first corner, and connected to the first external electrode,
   the sixth internal electrode has a sixth lead extending to the second corner or a portion adjacent to the second corner, and connected to the second external electrode,
   the seventh internal electrode has a seventh lead extending to the third corner or a portion adjacent to the third corner, and connected to the first external electrode, and
   the eighth internal electrode has an eighth lead extending to the fourth corner or a portion adjacent to the fourth corner, and connected to the second external electrode.

7. The multilayer chip capacitor of claim 1, further comprising one or more rectangular internal electrode pairs, each including a first rectangular internal electrode and a second rectangular internal electrode facing each other in the capacitor body with a dielectric layer therebetween and respectively connected to the first external electrode and the second external electrode over entire lengths in a long side direction,
   wherein the one or more rectangular internal electrode pairs are stacked in the capacitor body to form a first capacitor part,
   the one or more first internal electrode pairs and the one or more second internal electrode pairs are alternately stacked in the capacitor body to form a second capacitor body, and
   the first capacitor part and the second capacitor part are arranged in a stacked direction.

8. The multilayer chip capacitor of claim 7, wherein the first capacitor part is disposed at a lower end in the capacitor body, and the second capacitor part is disposed on the first capacitor part.

9. The multilayer chip capacitor of claim 7, wherein the first capacitor part is disposed at each of upper and lower ends in the capacitor body, and the second capacitor part is disposed between the first capacitor part disposed at the upper end and the first capacitor part disposed at the lower end.

10. The multilayer chip capacitor of claim 9, wherein the first capacitor part at the upper end is symmetrical with respect to the first capacitor part at the lower end, and the multilayer chip capacitor has upper and lower portions which are symmetrical to each other.

11. The multilayer chip capacitor of claim 7, wherein equivalent series resistance (ESR) per layer provided by the first internal electrode pair or the second internal electrode pair of the second capacitor part is higher than ESR per layer provided by the rectangular internal electrode pair including the first rectangular internal electrode and the second rectangular internal electrode facing each other within the first capacitor part, and equivalent series inductance (ESL) per layer provided by the rectangular internal electrode pair including the first rectangular internal electrode and the second rectangular internal electrode facing each other within the first capacitor part is lower than ESL per layer provided by the first internal electrode pair or the second internal electrode pair of the second capacitor part.

12. A multilayer chip capacitor comprising:
a capacitor body having a stacked structure of a plurality of dielectric layers and including first and second longer side surfaces facing each other and first and second shorter side surfaces facing each other;
a first external electrode and a second external electrode having different polarities and disposed at the first longer side surface and the second longer side surface, respectively;
one or more first internal electrode pairs each including a first internal electrode and a second internal electrode facing each other in the capacitor body with a dielectric layer therebetween;
one or more second internal electrode pairs each including a third internal electrode and a fourth internal electrode facing each other in the capacitor body with a dielectric layer therebetween;
a third internal electrode pair including a fifth internal electrode and a sixth internal electrode facing each other in the capacitor body with a dielectric layer therebetween; and
a fourth internal electrode pair including a seventh internal electrode and an eighth internal electrode facing each other in the capacitor body with a dielectric layer therebetween,
wherein:
the first to fourth internal electrodes each have one lead and are sequentially disposed in a stacked direction;
the first internal electrode has a first lead extending to a first corner at which the first longer side surface meets the first shorter side surface or to a portion adjacent to the first corner, the first lead being connected to the first external electrode;
the second internal electrode has a second lead extending to a second corner diagonally facing the first corner or a portion adjacent to the second corner, the second lead being connected to the second external electrode;
the third internal electrode has a third lead extending to a third corner at which the first longer side surface meets the second shorter side surface or a portion adjacent to the third corner, the third lead being connected to the first external electrode;

the fourth internal electrode has a fourth lead extending to a fourth corner diagonally facing the third corner or a portion adjacent to the fourth corner, the fourth lead being connected to the second external electrode;
the first internal electrode pair causes current to flow only from the first corner toward the second corner, and the second internal electrode pair causes current to flow only from the third corner toward the fourth corner;
the fifth to eighth internal electrodes each have one lead, and the first to eighth internal electrodes are sequentially disposed in a stacked direction;
the fifth internal electrode has a fifth lead extending to the first corner or a portion adjacent to the first corner, and connected to the first external electrode;
the sixth internal electrode has a sixth lead extending to the second corner or a portion adjacent to the second corner, and connected to the second external electrode;
the seventh internal electrode has a seventh lead extending to the third corner or a portion adjacent to the third corner, and connected to the first external electrode;
the eighth internal electrode has an eighth lead extending to the fourth corner or a portion adjacent to the fourth corner, and connected to the second external electrode; and
leads that are vertically adjacent to each other and have the same polarity extend in different directions forming a predetermined angle therebetween.

13. A multilayer chip capacitor comprising:
a capacitor body having a stacked structure of a plurality of dielectric layers and including first and second longer side surfaces facing each other and first and second shorter side surfaces facing each other;
a first external electrode and a second external electrode having different polarities and disposed at the first longer side surface and the second longer side surface, respectively;
one or more first internal electrode pairs each including a first internal electrode and a second internal electrode facing each other in the capacitor body with a dielectric layer therebetween;
one or more second internal electrode pairs each including a third internal electrode and a fourth internal electrode facing each other in the capacitor body with a dielectric layer therebetween;
a third internal electrode pair including a fifth internal electrode and a sixth internal electrode facing each other in the capacitor body with a dielectric layer therebetween; and
a fourth internal electrode pair including a seventh internal electrode and an eighth internal electrode facing each other in the capacitor body with a dielectric layer therebetween,
wherein:
the first to fourth internal electrodes each have one lead and are sequentially disposed in a stacked direction;
the first internal electrode has a first lead extending to a first corner at which the first longer side surface meets the first shorter side surface or to a portion adjacent to the first corner, the first lead being connected to the first external electrode;
the second internal electrode has a second lead extending to a second corner diagonally facing the first corner or a portion adjacent to the second corner, the second lead being connected to the second external electrode;
the third internal electrode has a third lead extending to a third corner at which the first longer side surface meets the second shorter side surface or a portion adjacent to the third corner, the third lead being connected to the first external electrode;

the fourth internal electrode has a fourth lead extending to a fourth corner diagonally facing the third corner or a portion adjacent to the fourth corner, the fourth lead being connected to the second external electrode;

the first internal electrode pair causes current to flow only from the first corner toward the second corner, and the second internal electrode pair causes current to flow only from the third corner toward the fourth corner;

the fifth to eighth internal electrodes each have one lead, and the first to eighth internal electrodes are sequentially disposed in a stacked direction;

the fifth internal electrode has a fifth lead extending to the first corner or a portion adjacent to the first corner, and connected to the first external electrode;

the sixth internal electrode has a sixth lead extending to the second corner or a portion adjacent to the second corner, and connected to the second external electrode;

the seventh internal electrode has a seventh lead extending to the third corner or a portion adjacent to the third corner, and connected to the first external electrode;

the eighth internal electrode has an eighth lead extending to the fourth corner or a portion adjacent to the fourth corner, and connected to the second external electrode;

leads that are vertically adjacent to each other and have the same polarity extend in different directions forming a predetermined angle therebetween;

the first lead extends to a portion of the first longer side surface adjacent to the first corner;

the second lead extends to a portion of the second longer side surface adjacent to the second corner;

the third lead extends to a portion of the first longer side surface adjacent to the third corner;

the fourth lead extends to a portion of the second longer side surface adjacent to the fourth corner;

the fifth lead extends to a portion of the first shorter side surface adjacent to the first corner;

the sixth lead extends to a portion of the second shorter side surface adjacent to the second corner;

the seventh lead extends to a portion of the second shorter side surface adjacent to the third corner; and the eighth lead extends to a portion of the first shorter side surface adjacent to the fourth corner.

\* \* \* \* \*